(12) United States Patent
Gillick et al.

(10) Patent No.: US 7,716,050 B2
(45) Date of Patent: May 11, 2010

(54) MULTILINGUAL SPEECH RECOGNITION

(75) Inventors: Laurence S. Gillick, Newton, MA (US);
Thomas E. Lynch, Framingham, MA (US); Michael J. Newman, Somerville, MA (US); Daniel L. Roth, Boston, MA (US); Steven A. Wegmann, Cambridge, MA (US); Jonathan P. Yamron, Sudbury, MA (US)

(73) Assignee: Voice Signal Technologies, Inc., Woburn, MA (US)

( * ) Notice: Subject to any disclaimer, the term of this patent is extended or adjusted under 35 U.S.C. 154(b) by 1783 days.

(21) Appl. No.: 10/716,027

(22) Filed: Nov. 17, 2003

(65) Prior Publication Data

US 2004/0210438 A1    Oct. 21, 2004

Related U.S. Application Data

(60) Provisional application No. 60/426,918, filed on Nov. 15, 2002.

(51) Int. Cl.
*G10L 15/00* (2006.01)
(52) U.S. Cl. .................................................. 704/254
(58) Field of Classification Search ................ 704/254, 704/256.7, 256.8
See application file for complete search history.

(56) References Cited

U.S. PATENT DOCUMENTS 4,903,305 A    2/1990    Gillick et al.
6,085,160 A    7/2000    D'hoore et al.
6,912,499 B1 *    6/2005    Sabourin et al. ............ 704/243
7,043,431 B2 *    5/2006    Riis et al. .................... 704/259
7,149,688 B2 *    12/2006    Schalkwyk .................. 704/255

FOREIGN PATENT DOCUMENTS

EP    1 291 848    3/2003

OTHER PUBLICATIONS

Riis et al, "Multilingual Text-to-Phoneme Mapping," Proceedings of the Eurospeech 2001 Conference, vol. 2:3-7, pp. 1441-1444, Sep. 2001.*

(Continued)

*Primary Examiner*—Angela A Armstrong
(74) *Attorney, Agent, or Firm*—Chapin IP Law, LLC

(57) ABSTRACT

A method for speech recognition. The method uses a single pronunciation estimator to train acoustic phoneme models and recognize utterances from multiple languages. The method includes accepting text spellings of training words in a plurality of sets of training words, each set corresponding to a different one of a plurality of languages. The method also includes, for each of the sets of training words in the plurality, receiving pronunciations for the training words in the set, the pronunciations being characteristic of native speakers of the language of the set, the pronunciations also being in terms of subword units at least some of which are common to two or more of the languages. The method also includes training a single pronunciation estimator using data comprising the text spellings and the pronunciations of the training words.

48 Claims, 4 Drawing Sheets

OTHER PUBLICATIONS

Deshmukh et al., "An Advanced System To Generate Pronunciations of Proper Nouns", *Acoustics, Speech, And Signal Processing, 1997. ICASSP-97., 1997 IEEE International Conference On Munich, Germany*, 21-24, pp. 1467-1470 (Apr. 1997).

Riis, et al., "Multilingual Text-To-Phoneme Mapping", *Proceedings of The Eurospeech 2001 Conference*, vol. 2:3-7, pp. 1441-1444 (Sep. 2001).

Tian et al., "Pronunciation and Acoustic Model Adaptation for Improving Multilingual Speech Recognition", *International Workshop On Adaptation Methods For Speech Recognition*, 29-30, pp. 131-132 (Aug. 2001).

* cited by examiner

MULTILINGUAL SPEECH RECOGNITION

CROSS-REFERENCE TO RELATED APPLICATIONS

This application incorporates by reference the content of U.S. Provisional Application No. 60/426,918, filed Nov. 15, 2002, to Gillick et al., entitled MULTI-LINGUAL SPEECH RECOGNITION.

TECHNICAL FIELD

The present invention relates to multilingual speech recognition.

BACKGROUND

Speaker independent word recognition is an important technology for use in cell phones and other programmable, portable devices requiring user interaction. Such technology enables a user to call a person in his phone list by simply saying the proper name of that individual. First, a speech recognition system takes as input a text spelling of the proper name of the individual. The speech recognition system next maps the text spelling to an acoustic word model. The acoustic word model maps a proper name to sounds of utterances of the word. The acoustic word model joins a set of acoustic word models of proper names to be recognized by the speech recognition system. Upon receiving an utterance of a proper name by the user, the speech recognition system matches the utterance to the acoustic word models of the proper names to be recognized. The speech recognition system considers the best match to be the proper name that was uttered by the user. In some cases, a user's utterances of commands from a specified command set, in addition to proper names, can also be recognized by the speech recognition system.

Some speech recognition systems use a set of acoustic phoneme models to map text spellings of words to acoustic word models. A phoneme is a representation of any of the small units of speech sound in a language that assists to distinguish one word from another. For example, the phoneme "aa" is the 'a' sound in father, and the phoneme "jh" is the 'j' sound in joy. An acoustic phoneme model is a model of different possible acoustics that are associated with a given phoneme. Other subword units can also be used to represent speech sounds.

In some examples, the acoustic phoneme models are Hidden Markov Models (HMM). HMM are statistically trained models that yield the statistical likelihood that a particular series of sound was produced given that a known word was spoken.

Given the set of acoustic phoneme models, a speech recognition system can use a pronunciation estimator to map text spellings of words to be recognized into pronunciations. These pronunciations can be modeled as a sequence of phonemes. Next, the speech recognition system can map these pronunciations to some sequence of acoustic phoneme models using the set of acoustic phoneme models. The resulting sequences of acoustic phoneme models are the acoustic word models that are used to recognize utterances from the user.

Generating the pronunciation estimator for portable speech recognition systems has the following challenge. There are many people in contemporary society who function in a highly multilingual environment, such as is found in much of Europe. One might work with people from many different countries who speak many different languages. In the example of speech recognition of proper names, it is not uncommon for a multilingual speaker to say the name of a person from Mexico using a native Mexican accent, the name of a person from Germany using a native German accent, and so forth. It is also possible for a speaker to say the names of persons from Mexico and Germany using an American accent. Thus, there can be a one to many mapping from a text spelling of a name to its pronunciation.

Furthermore, there are a very large number of possible names for people (there are roughly two million different names in US phonebooks), and most portable speech recognition systems have small vocabularies to enable them to fit into the relatively small memories of portable devices such as cellphones. Thus, it is currently impractical to include the various pronunciations of all names in these portable devices.

In some cases, multilingual speech recognition has been employed in which pronunciations of words from different languages are represented using a common set of phonemes. Words in each language can be mapped to their pronunciations in a language-dependent manner, for example, using a different pronunciation dictionary for each language or using a language dependent pronunciation estimator.

SUMMARY

In one aspect, the invention features a method for speech recognition. The method includes accepting text spellings of training words in a plurality of sets of training words, each set corresponding to a different one of a plurality of languages. The method also includes, for each of the sets of training words in the plurality, receiving pronunciations for the training words in the set, the pronunciations being characteristic of native speakers of the language of the set, the pronunciations also being in terms of subword units at least some of which are common to two or more of the languages. The method also includes training a single pronunciation estimator using data comprising the text spellings and the pronunciations of the training words.

Embodiments may include one or more of the following. The method includes accepting a plurality of sets of utterances, each set corresponding to a different one of the plurality of languages, the utterances in each set being spoken by the native speakers of the language of each set, and training a set of acoustic models for the subword units using the accepted sets of utterances and pronunciations estimated by the single pronunciation estimator from text representations of the training utterances. A first training word in a first set in the plurality corresponds to a first language and a second training word in a second set corresponds to a second language, the first and second training words having identical text spellings, the received pronunciations for the first and second training words being different. Utterances of the first and the second training words are used to train a common subset of subword units. The single pronunciation estimator uses a decision tree to map letters of the text spellings to pronunciation subword units. Training the single pronunciation estimator further includes forming, from sequences of letters of each training word's textual spelling and the corresponding grouping of subword units of the pronunciation, a letter to subword mapping for each training word, and training the single pronunciation estimator using the letter-to-subword mappings. In this case, training the single pronunciation estimator and training the acoustic models can be executed by a nonportable programmable device.

In some cases, the method further includes generating, for each word in a list of words to be recognized, an acoustic word model, the generating including generating a grouping of subword units representing a pronunciation of the word to be recognized using the single pronunciation estimator. In these cases, the grouping of subword units can be a linear sequence of subword units. Furthermore, the grouping of the acoustic subword models can be a linear sequence of acoustic subword models.

In other cases, the subword units are phonemes and the grouping of subwords can be a network representing two pronunciations of a word, the two pronunciations being representative of utterances of native speakers of two languages.

The method can further include processing an utterance and scoring matches between the processed utterance and the acoustic word models. In this case, generating the acoustic word model, processing the utterance, and scoring matches can be executed by a portable programmable device. In some cases, the portable programmable device is a cellphone.

The utterance can be spoken by a native speaker of one of the plurality of languages. In other cases, the utterance is spoken by a native speaker of a language other than the plurality of languages, the language having similar sounds and similar letter to sounds rules as a language from the plurality of languages.

In another aspect, the invention features a method for recognizing words spoken by native speakers of multiple languages. The method includes generating a set of estimated pronunciations, using a single pronunciation estimator, from text spellings of a set of acoustic training words, each pronunciation comprising a grouping of subword units, the set of acoustic training words comprising at least a first word and a second word, the first and second words having identical text spelling, the first word having a pronunciation based on utterances of native speakers of a first language, the second word having a pronunciation based on utterances of native speakers of a second language. The method also includes mapping sequences of sound associated with utterances of each of the acoustic training words against the estimated pronunciation associated with each of the acoustic training words. The method also includes using the mapping of sequences of sound to estimated pronunciations to generate acoustic subword models for the subword units in the grouping of subwords, the acoustic subword model comprising a sound model and a subword unit.

In another aspect, the invention features a method for multilingual speech recognition including accepting a recognition vocabulary that includes words from multiple languages, determining a pronunciation of each of the words in the recognition vocabulary using a pronunciation estimator that is common to the multiple languages, and configuring a speech recognizer using the determined pronunciations of the words in the recognition vocabulary.

In embodiments, the method includes accepting a training vocabulary that comprises words from multiple languages, determining a pronunciation of each of the words in the training vocabulary using the pronunciation estimator that is common to the multiple languages, configuring the speech recognizer using parameters estimated using the determined pronunciations of the words in the training vocabulary, and recognizing utterances using the configured speech recognizer.

Embodiments of the invention may have one or more of the following advantages. The speech recognizer can do language independent word recognition for multiple languages that are included in the training data. The language independent speech recognizer can be stored and executed using a relatively small amount of computer memory because the speech recognizer only uses a single pronunciation estimator.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
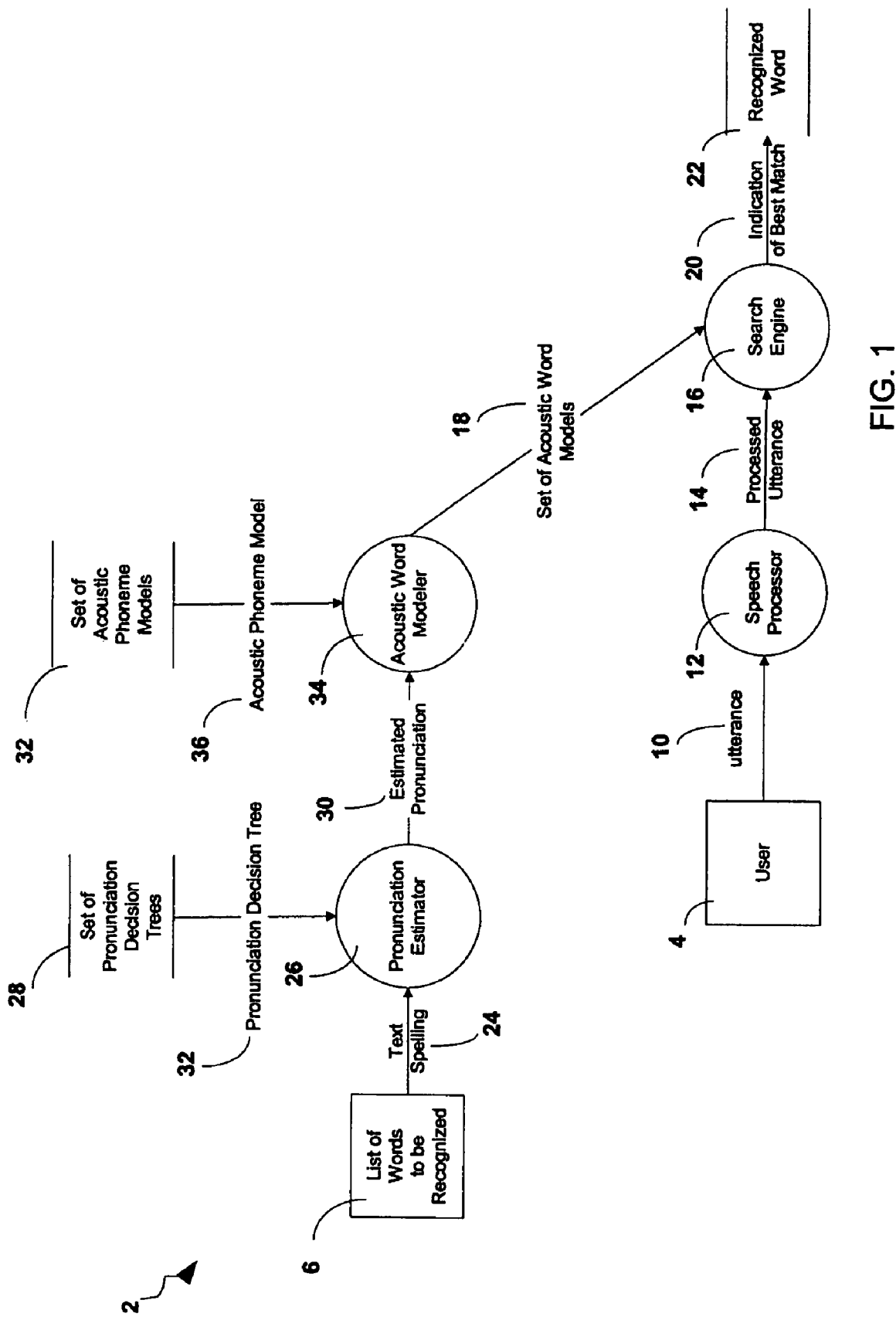
FIG. 1 is a data flow diagram of a speech recognition system.

Referring to FIG. 1, a speech recognition system 2 automatically recognizes distinct words from a list 6 of words from speech utterances by a user 4. The user 4 produces an utterance 10 that is received by a speech processor 12. The user 4 produces the utterance 10 of a word using a particular pronunciation. The word is from the list 6 of words to be recognized. The words in the list 6 are words that may come from two or more training languages. The user 4 can be a native speaker of one language that is not necessarily known to the system, and may speak an unknown one of the training languages with native pronunciations. Accordingly, the utterance 10 may be pronounced by the user 4 using a pronunciation of native speakers of any of two or more languages.

The speech processor 12 breaks the utterance 10 into a processed utterance 14. The processed utterance 14 can include time based vectors modeling the sound spectrum of the utterance 10. The speech processor 12 sends the processed utterance 14 to a search engine 16. The search engine 16 receives the processed utterance 14 and a set 18 of acoustic word models. The set 18 of acoustic word models includes one or more acoustic word models for each word in the list 6 of words to be recognized. The search engine 16 scores the match between the sounds of the processed utterance 14 and the set 18 of acoustic word models. Once this scoring is done, the search engine 16 outputs an indication 20 of a recognized word 22 having the best score in the match. The recognized word 22 is the word having the best score.

The set 18 of acoustic word models is generated from the list 6 of words to be recognized. The list 6 of words to be recognized includes text spellings of the words. A set 24 of these text spellings is sent to a language-independent pronunciation estimator 26. Each text spelling 24 of a word includes a sequence of letters in an alphabet such as a Roman alphabet used for various European languages. The pronunciation estimator 26 also receives a pronunciation decision tree 32 from a set 28 of pronunciation estimation data 28. The pronunciation estimator 26 uses the pronunciation decision tree 32 to determine the pronunciations of words. The decision tree 32 is a binary tree that classifies target objects by asking binary questions in a hierarchical manner. The binary questions can include questions about which letter it is and the context of the letter in a word, where the context includes letters surrounding the letter in a word. For every letter in the alphabet, the pronunciation decision tree 32 maps the letter (in its particular context) to zero or more phonemes. For each word in the list 6, the pronunciation estimator 26 takes each letter in the word's spelling 24 and uses the pronunciation decision tree 32 to generate an estimated pronunciation for the letter. A set of these estimated pronunciations for the letters in the word is an estimated pronunciation 30 for the word. In some cases, the estimated pronunciation 30 for the word is a sequence of phonemes.

The pronunciation estimator 26 is not tailored to any particular language because the system does not know with which pronunciation a word will be spoken. The pronunciation estimator 26 is trained using pronunciation data from multiple languages. The pronunciation estimator 26 estimates the pronunciation 30 that represents the most probable pronunciation of the word from list 6. In alternative implementations, an estimated pronunciation 30 that represents all or multiple of the possible pronunciations of the word in the pronunciation data is used to train the pronunciation estimator 26.

An acoustic word modeler 34 generates the set 18 of acoustic word models. The acoustic word modeler 34 receives estimated pronunciations 30 for words in the list 6. The acoustic word modeler 34 also receives a set 33 of trained acoustic phoneme models. For each word in the list 6, the acoustic word modeler 34 matches phonemes in the estimated pronunciation 30 to an acoustic-phoneme model 36 from the set 33. The acoustic word modeler 34 subsequently generates an acoustic word model for the word. The acoustic word models for words in the list 6 form the set 18 of acoustic word models. In some cases, the acoustic word model is a sequence of acoustic phoneme models matching the sequence of phonemes in the estimated pronunciation 30. The acoustic word models for the words in the list 6 are the set 18 of acoustic word models.

Each acoustic-phoneme model 36 is an HMM that yields the statistical likelihood that a particular series of sounds will be produced by speakers speaking the phoneme. The set 33 of acoustic phoneme models are language independent in that the possible acoustics and their statistics are derived from sets of training utterances from multiple languages. The set 33 of acoustic phoneme models are trained by associating pronunciations (e.g., collections of phonemes) of training words with utterances of these training words.

A variety of forms of acoustic phoneme models can alternatively be used. In this system, the acoustic phoneme models 36 model the statistics associated with the possible acoustics by mixtures of Gaussian distributions to represent the acoustic realization of a variety of different realizations of a particular phoneme, such as realizations that might be found in different languages. As an example, a Gaussian mixture in the acoustic phoneme model 36 might statistically match both the first 'e' in Peter as a long "ee" sound (as in English) or as a long "ay" sound (as in German).

The speech recognition system 2 also can recognize words from a language for which there was no training data (e.g., word lists 104, 106 and utterances 218, 220) used in creating either the pronunciation estimator 26 or the acoustic phoneme models 36 or both. This is possible as long as most of the sounds in the language appear in the training languages and the pronunciation rules for the new language are similar enough to the training languages. For example, a system 2 could have a pronunciation decision tree 32 and acoustic phoneme models 36 that are based on French, Spanish and Italian. This system 2 could recognize utterances 10 that are spoken in Portuguese or with a Portuguese accent because Portuguese is similar to French, Spanish, and Italian.

Figure 2:
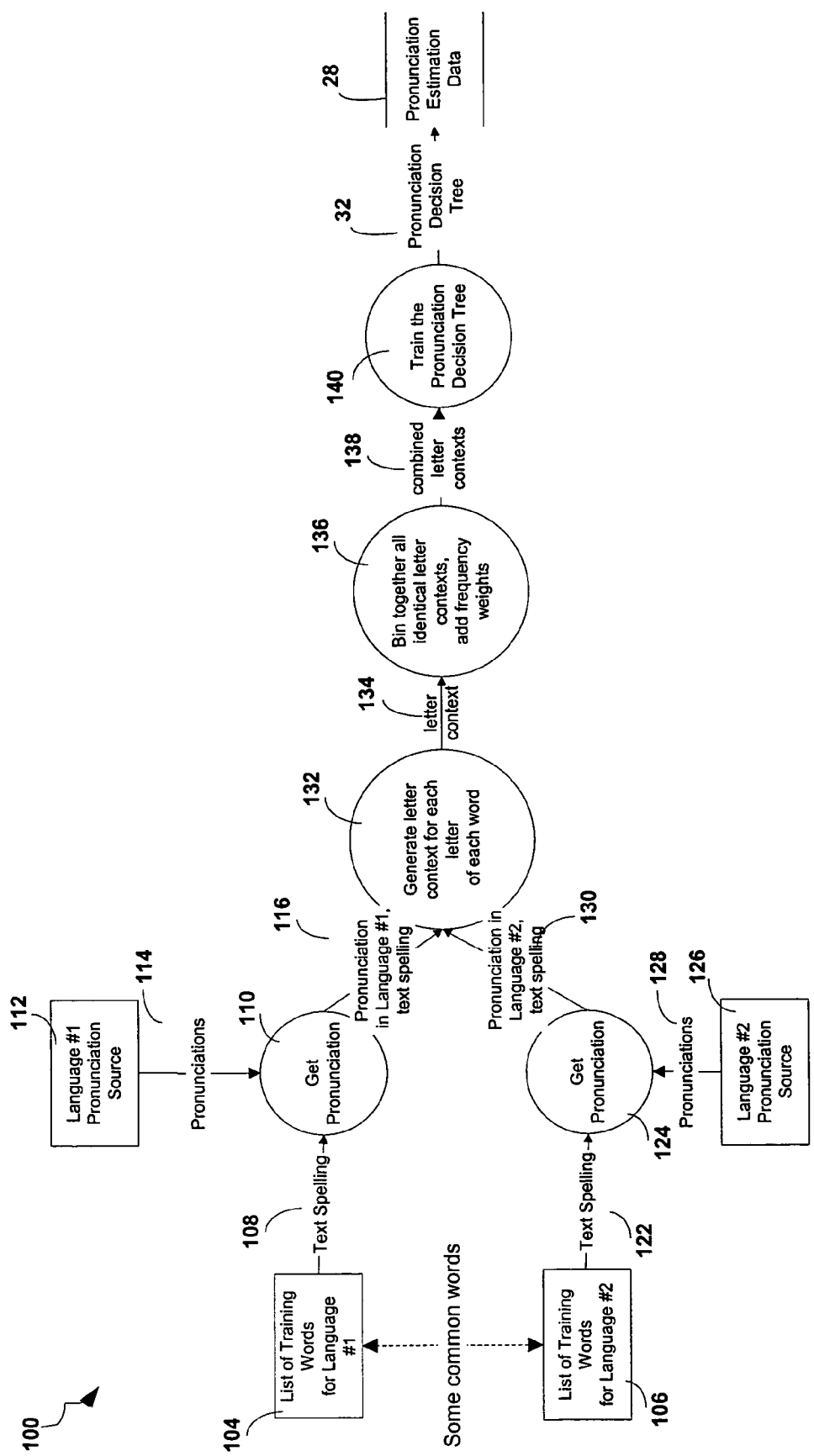
FIG. 2 is a data flow diagram of training a language independent pronunciation guesser.

Referring to FIG. 2, a process 100 trains the pronunciation decision tree 28 for the pronunciation estimator 26. The process 100 can be executed independently of the speech recognition system 2, for example on a computer workstation with substantially more processing power than the target device that implements the speech recognition system 2 (referring to FIG. 1). The process 100 makes use of two lists of training words 104, 106 from a first and a second training language, respectively. In the general case, the process 100 can make use of lists of training words from two or more training languages. The two lists 104, 106 can have words in common. For example, the same proper names can occur in both lists 104, 106. Process 100 includes getting (110) pronunciations 114 from pronunciation source 112 based on text spellings 108 from list 104 for the first training language. Process 100 also includes getting (124) pronunciations 128 from pronunciation source 126 based on text spellings 122 from list 106 for the second training language. Text spellings 108 and 122 from different languages can have letters in common.

Pronunciation sources 112, 126 can be proper name dictionaries, can be compiled by humans, or can be generated by high-quality pronunciation estimators. The pronunciations 114, 128 from pronunciation sources 112, 126 are considered, for the purposes of this document, to be "correct" pronunciations for a given language. Accordingly, estimated pronunciations 30 that deviate from either of the two pronunciations 114, 128 for a given word are considered to be "errorful". Since process 100 is done independently of the speech recognition system 2, pronunciation sources 112, 126 can occupy large amounts of memory not available for the runtime speech recognition systems on portable devices such as cellphones. In the case of a proper name being in both lists 104, 106, pronunciation sources 112, 126 may generate different pronunciations 114, 128.

Process 100 includes generating (132) letter contexts 134 for each letter in the spelling of each training word in the lists 104, 106. The letter context 134 includes a letter; a sequence of 0 or more phonemes of the word's phonetic spelling against which the letter has been mapped; and a mapping context. The mapping context includes the letter and a set of letters, if any, that occur near the current letter in the text spelling of the training word. The context can include other information as well: adjacent phonemes or stress markers.

Process 100 includes grouping (136) together all identical letter contexts 134. This is done by identifying all letter contexts 134 having identical letters, identical phonemes, and identical mapping contexts. Identical letter contexts 134 are grouped into combined letter contexts 138. In some cases, each combined letter context 138 can have a weight that is the number of the identical letter contexts 134 represented by the combined letter context 138.

Process 100 also includes training (140) the pronunciation decision tree 32 for the pronunciation estimation data 28. For each letter of the alphabet, the training includes calling a decision tree training algorithm for a set of combined letter contexts 138 created for the letter, including the weight associated with each combined letter context 138. Techniques for training decision trees are commonly understood, for example based on an entropy-reducing clustering algorithm. An example of an entropy-reducing clustering algorithm for training speech recognition decision trees is described in "Large vocabulary continuous speech recognition: A review", by Steve Young. in Proceedings of the IEEE Workshop on Automatic Speech Recognition and Understanding, pages 3-28, Snowbird, Utah, December 1995. IEEE.

In some cases, the pronunciation estimator 26 is errorful because the estimated pronunciation 30 represents only the most probable pronunciation for spellings 108, 122 of training words. In such cases, the estimated pronunciation 30 does not include other, less probable pronunciations. A typical representation of the estimated pronunciation 30 with only the most probable pronunciation is a sequence of phonemes. For instance, a pronunciation estimator 26 that is errorful can erroneously assign the same phonetic spelling to the name "Phillip", pronounced by native speakers of French as "Phillippe", as it has to the name "Philip", as pronounced by native speakers of English.

In an alternative version of the system, the pronunciation estimator 26 can produce multiple pronunciations in the estimated pronunciation 30. In some of these cases, the pronunciation estimator 26 can generate an estimated pronunciation 30 that models two or more pronunciations as networks of phonemes rather than sequences of phonemes. In such cases, a network of phonemes representing two different pronunciations for a given text spelling of a word can include a fork with two branches of distinct phonemes. In other versions, the pronunciation estimator 26 can generate two or more estimated pronunciations 30 from a text spelling of a word.

In another alternative version of the system, the pronunciation estimator 26 uses a set of decision trees to estimate pronunciations. In this version, there can be a decision tree for each letter of the alphabet.

Figure 3:
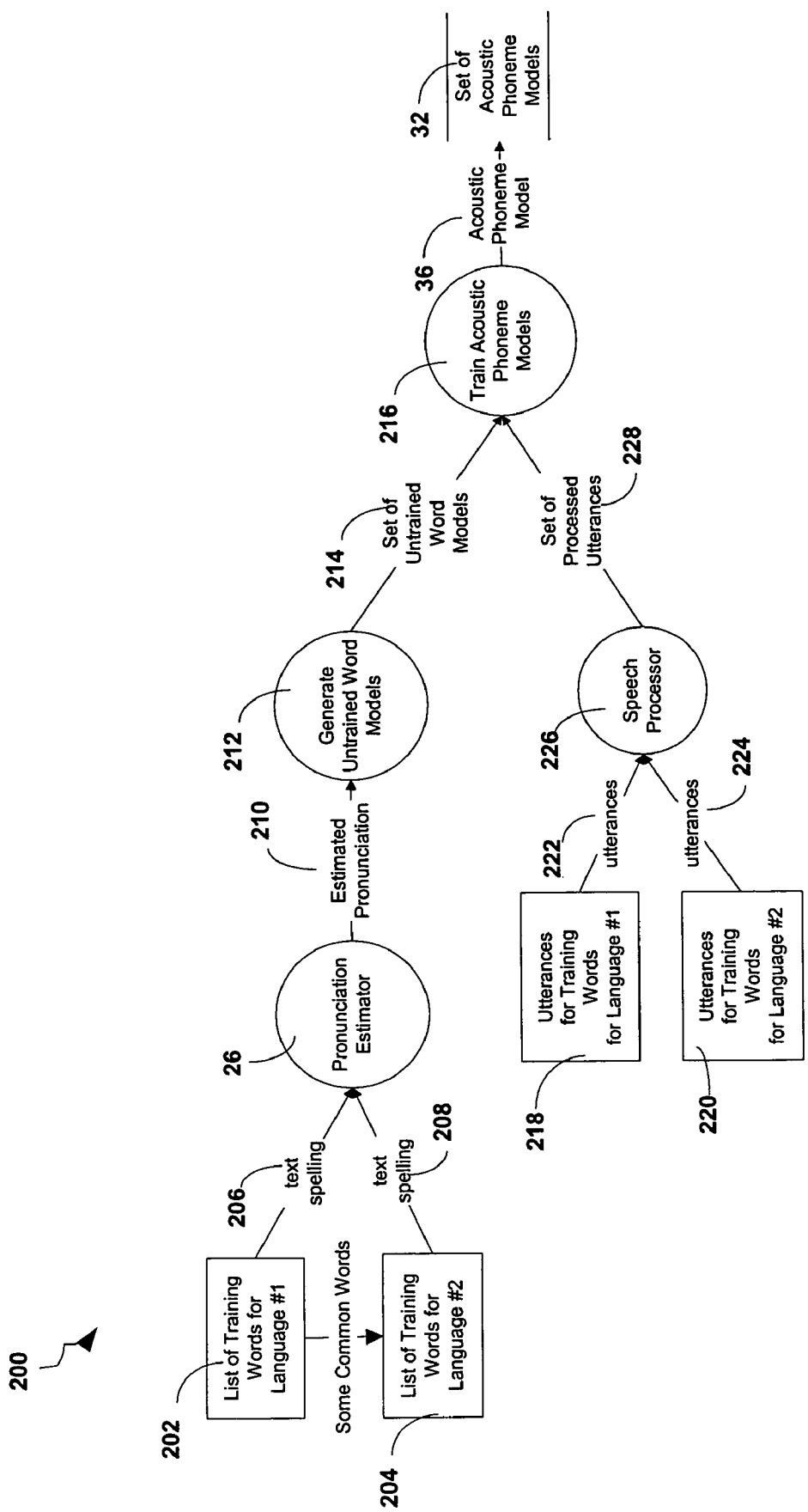
FIG. 3 is a data flow diagram of a process for training acoustic phoneme models.

Referring to FIG. 3, a process 200 trains the set 33 of acoustic phoneme models using training words from two training languages. In general, the process 200 can be used with training words from two or more training languages. As with process 100, which is used to train the pronunciation estimator 26, the process 200 can be executed independently of the speech recognition system 2.

The process 200 includes sending text spellings 206 from a list 202 of training words for the first training language to the pronunciation estimator 26. The process 200 also includes sending text spellings 208 from a list 204 of training words for the second training language to the pronunciation estimator 26. As with lists 104, 106, the lists 202, 204 can have words in common.

The pronunciation estimator 26 generates estimated pronunciations 210 for the text spellings 206, 208. As described previously, each estimated pronunciation 210 for words in lists 202, 204 can be modeled as a sequence of phonemes, a network of phonemes, or each estimated pronunciation 210 represents two or more pronunciations.

Process 200 generates (212) a set 214 of untrained word models for the training words. The untrained word models 214 include groupings of untrained acoustic phoneme models corresponding to the word's estimated pronunciation 210. These groupings can be sequences of untrained acoustic phoneme models corresponding to the sequences of phonemes in estimated pronunciations 210.

Process 200 maps pronunciations of the training words against recorded utterances of the training words. Lists 218, 220 store utterances of the training words from the lists 202, 204, respectively. The lists 218, 220 provide the recorded utterances for process 200.

Process 200 includes using a speech processor 226 to process utterances 222, 224 from lists 218, 220. The speech processor 226 breaks the utterances 222, 224 into a set 228 of processed utterances. The set 228 of processed utterances include time based vectors modeling the sound spectrum of the utterances 222, 224. The processed utterances 228 can be matched with the estimated pronunciations 210 in the untrained acoustic phoneme models of the set 214 of untrained word models.

Process 200 includes training (216) the set 33 of acoustic-phoneme models by iteratively using the HMM process to map one or more utterances of each training word against the acoustic model for that word. Once this has been performed for all the untrained word models in the set 214, each acoustic phoneme model 36 is altered to reflect the distribution of sounds that have been mapped against it over all of the training words in which it occurs. As is common in the training of HMM-based acoustic-phoneme models, the iteration can be repeated until the degree of improvement created by further iteration drops below a certain level. Subsequently, the set 33 of acoustic-phoneme models includes an acoustic model 36 for each phoneme used by the system.

The acoustics portion of the acoustic phoneme models 36 is defined by multiple acoustic parameters. The trained acoustic phoneme models 36 include probability distributions for multiple acoustic parameters. Each probability distribution is produced by training for the given acoustic parameter model. The probability distributions are a weighted blend of probability distributions corresponding to the sound of the given phoneme. In cases when the pronunciation estimator 26 is errorful, the probability distributions also can represent the sounds of a set of one or more associated phonemes for which the given phoneme is incorrect in estimated pronunciations 210 produced by the errorful pronunciation estimator 26. In this blend, a weight of the contribution of the sound of each of different phonemes is a function of the number of utterances (from training utterances 218, 220) associated with the sounds of each such phoneme.

Examples of the acoustic phoneme models 36 include monophone acoustic models or more complex acoustic models such as the triphone acoustic models. Both models include acoustic parameters. In general, better recognition is produced with more complex acoustic models, such as the triphone models. This is because the triphone models are capable of representing the acoustic variations of a given phoneme when the phoneme occurs in different phonetic contexts, as well as the sequence of different sounds formed as the vocal apparatus generates a phoneme in a given phonetic context.

In embodiments using triphone acoustic phoneme models, process 200 includes additional training of the acoustic phoneme models 36 to allow a more compact representation of triphone models.

This additional training includes a loop performed for each of the phonemes used in the phonetic spellings of the system. For each such phoneme, a sub-loop is performed for each triphone node number n, for the values of n from one through three. For each such triphone node number, an acoustic-node-clustering decision tree algorithm operates in a manner roughly similar to that of the algorithm for training the decision tree 32 for the pronunciation estimator 26 described above.

As mentioned previously, a pronunciation estimator 26 that is errorful can erroneously assigns the same phonetic spelling to the name "Phillip", pronounced by native speakers of French as "Phillippe", as it has to the name "Philip", as pronounced by native speakers of English. As a result of this error, the triphone acoustic phoneme model 36 having the phonetic spelling "ih-l-ih", which corresponds to the sound of an "l" occurring in the context of a short "i" both before and after it, gets mapped not only against a portion of English utterances, spoken as "Philip", but also against portions of French utterances, spoken as "Phillippe", corresponding to the sound of the triphone "ih-l-iy", in which the phoneme after the "l" is a long "e".

Similarly, the triphone acoustic phoneme model for the triphone "l-ih-p" not only gets mapped against portions of English utterances corresponding to that triphone, but also against portions of French utterances having a sound corresponding to the triphone "l-iy-p".

Figure 4:
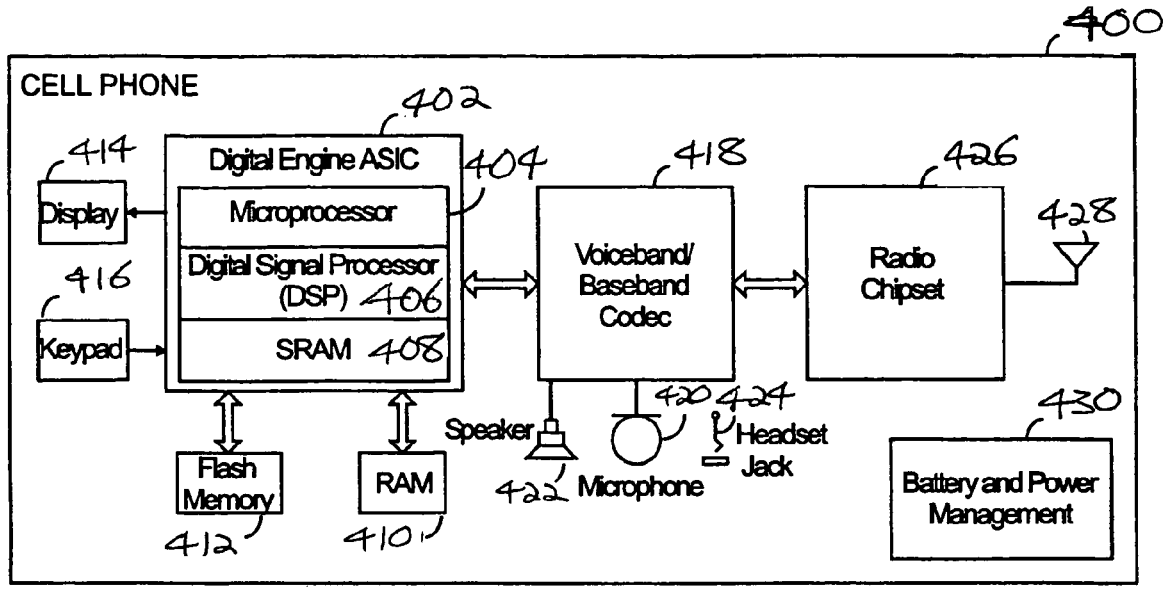
FIG. 4 is a schematic block diagram showing basic components of a cell phone with speech recognition.

Similarly, a triphone which models the triphone "ih-p-Ø" (where Ø corresponds to silence) not only gets mapped against portions of English utterances corresponding to that triphone, but also against portions of the French utterances that corresponds to the triphone "iy-p-Ø". Referring to FIG. 4, a cellphone 400 with speech recognition includes a digital engine ASIC 402, which is an integrated circuit that includes circuitry that comprises a microprocessor 404, a digital signal processor 406, and relatively high speed static random access memory (SRAM) 408. The ASIC 402 is connected so as to read program instructions from, and to write data to, a relatively small amount of random access memory 410 and a significantly larger amount of flash programmable nonvolatile memory 412, which acts as a mass storage device for the cellphone 400. The microprocessor 404 of the ASIC 402 drives a display 414. It also receives input from a keypad 416. The ASIC is connected to receive data from, and supply data to, a voiceband/baseband codec 418. This codec is connected to receive input from a microphone 420 and to drive a speaker 422. It is also designed to receive input from and output to a cellphone handset through a headphone jack 424. The codec is connected to a radio frequency chipset 426, which is capable of transmitting and receiving digital signals via radio frequency over an antenna 428. The cellphone 400 also includes battery and power management circuitry 430.

Figure 5:
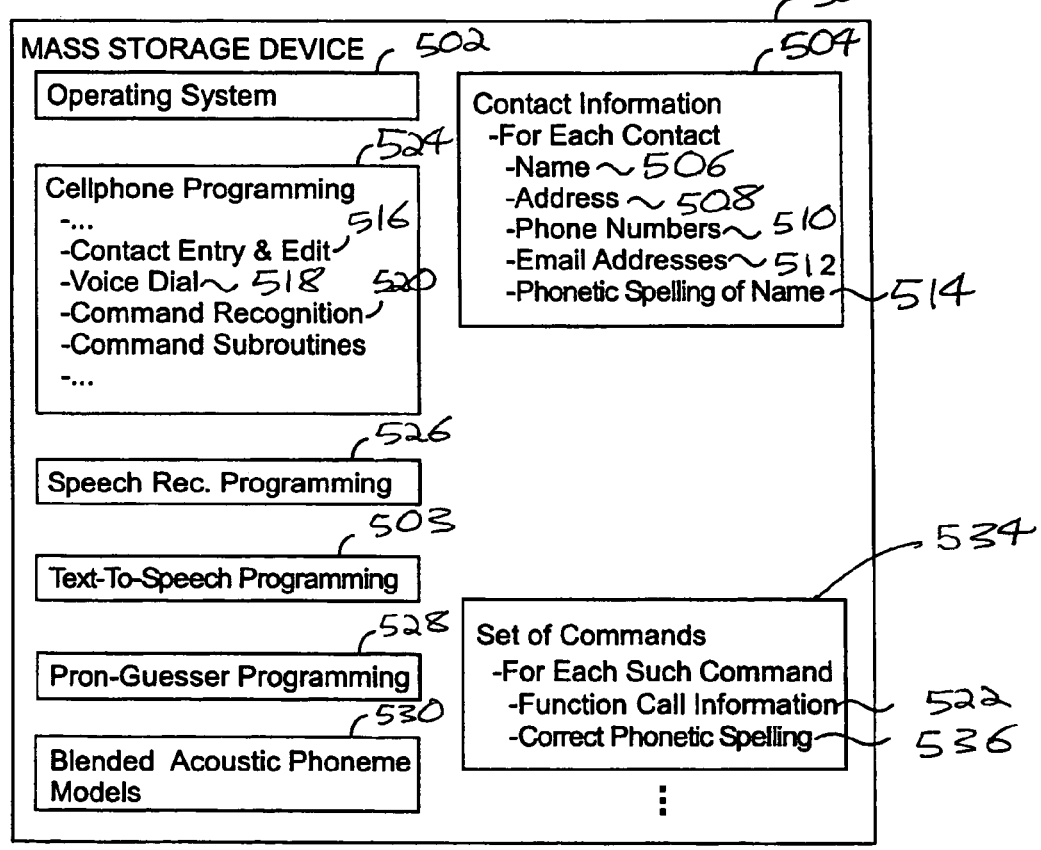
FIG. 5 is a schematic diagram showing some of the programming and data objects stored in the mass storage device of a cell phone of FIG. 4.

In some examples, referring to FIG. 5, the flash memory 412 can be a mass storage device 500. However, other types of mass storage devices appropriate for use in a cellphone can also be used.

The mass storage device 500 can store operating-system programming 502 as well as the cellphone's control programming. The control programming includes text-to-speech synthesis programming 503. This is a well-known type of programming capable of generating the sound of a word from its phonetic spelling. The mass storage device 500 also stores a speech recognition program 526 for executing speech recognition system 2 (FIG. 1). The mass storage device 500 also stores a pronunciation estimation program 528 for implementing pronunciation estimator 26. The mass storage device 500 also stores the set 33 of acoustic phoneme models and possibly, pronunciations for each of a plurality of commands in cellphone programming 524.

The cellphone control programming 524 includes program 516 for enabling the entry and editing of contact information, program 518 for performing voice dialing, and program 520 for recognizing and evoking commands by voice recognition. This contact entry and edit programming 516 enables the user to enter contact information 504 for each of a plurality of contacts, which can include for each contact a name 506, an address 508, one or more phone numbers 510, an e-mail address 512, and a phonetic spelling 514 of the name 506. The pronunciation estimation program 528 can generate the pronunciations 514.

A demonstration system based on these underlying ideas has been developed. The demonstration system relies on the use of a pronunciation estimator and an acoustic model trained on both English and Spanish data and enables the user to say either English or Spanish names and obtain satisfactory recognition performance. An error rate of 3% has been obtained when recognizing from a list of 150 English names and 150 Spanish names.

A number of embodiments of the invention have been described. Nevertheless, it will be understood that various modifications may be made without departing from the spirit and scope of the invention. For example, the acoustic phoneme models can be segregated blended acoustic phoneme models where each acoustic phoneme model is a weighted sum of separate unblended, or pure, acoustic phoneme models. For another example, other techniques besides decision trees (e.g., neural networks) for training and representing the pronunciation estimator and the acoustic phoneme models can be used. For another example, training words from a third language can be added to embodiments of the invention such that words uttered by native speakers of the third language can be recognized. For another example, phonemes may not be used to model pronunciation. In this example, some other pronunciation subword unit can be used to model pronunciation. For instance, a pronunciation subword unit can be a time slice in an utterance rather than a distinct sound. For another example, each letter context can be associated with a frequency weight that is calculated as a function of the frequency of the occurrences of training words having the letter context.

Accordingly, other embodiments are within the scope of the following claims.

What is claimed is:

1. A computer-implemented method in which a computer system initiates execution of software instructions stored in memory, the computer-implemented method comprising:
   accepting text spellings of training words in a plurality of sets of training words, each set corresponding to a different one of a plurality of languages;
   for each of the sets of training words in the plurality, receiving pronunciations for the training words in the set, the pronunciations being characteristic of native speakers of the language of the set, the pronunciations also being in terms of subword units at least some of which are common to two or more of the languages; and
   training a single pronunciation estimator using data comprising the text spellings and the pronunciations of the training words; and
   calculating a single acoustic subword model for each subword unit, based on the pronunciations in the plurality of sets of training words, by mixing distributions of acoustic parameters representing the sounds of the subword unit in multiple languages when a subword unit is common to two or more languages.

2. The computer-implemented method of claim 1 further comprising:
   accepting a plurality of sets of utterances, each set corresponding to a different one of the plurality of languages, the utterances in each set being spoken by the native speakers of the language of each set; and
   training a set of acoustic models for the subword units using the accepted sets of utterances and pronunciations estimated by the single pronunciation estimator from text representations of the training utterances.

3. The computer-implemented method of claim 1, wherein a first training word in a first set in the plurality corresponds to a first language and a second training word in a second set corresponds to a second language, the first and second training words having identical text spellings, the received pronunciations for the first and second training words being different.

4. The computer-implemented method of claim 3, wherein utterances of the first and the second training words are used to train a common subset of subword units.

5. The computer-implemented method of claim 1, wherein the single pronunciation estimator uses a decision tree to map letters of the text spellings to pronunciation subword units.

6. The computer-implemented method of claim 1, where training the single pronunciation estimator further comprises: forming, from sequences of letters of each training word's textual spelling and the corresponding grouping of subword units of the pronunciation, a letter to subword mapping for each training word; and training the single pronunciation estimator using the letter-to-subword mappings.

7. The computer-implemented method of claim 6, wherein training the single pronunciation estimator and training the acoustic models is executed by a nonportable programmable device.

8. The computer-implemented method of claim 1 further comprising:
generating, for each word in a list of words to be recognized, an acoustic word model, the generating comprising generating a grouping of subword units representing a pronunciation of the word to be recognized using the single pronunciation estimator.

9. The computer-implemented method of claim 8, wherein the grouping of subword units is a linear sequence of subword units.

10. The computer-implemented method of claim 9, wherein the grouping of the acoustic subword models is a linear sequence of acoustic subword models.

11. The computer-implemented method of claim 8, wherein the subword units are phonemes.

12. The computer-implemented method of claim 8, wherein the grouping of subwords is a network, and the network represents two pronunciations of a word, the two pronunciations being representative of utterances of native speakers of two languages.

13. The computer-implemented method of claim 8 further comprising:
processing an utterance; and
scoring matches between the processed utterance and the acoustic word models.

14. The computer-implemented method of claim 13, wherein generating the acoustic word model, processing the utterance, and scoring matches is executed by a portable programmable device.

15. The computer-implemented method of claim 14, wherein the portable programmable device is a cellphone.

16. The computer-implemented method of claim 13, wherein the utterance is spoken by a native speaker of one of the plurality of languages.

17. The computer-implemented method of claim 14, wherein the utterance is spoken by a native speaker of a language other than the plurality of languages, the language having similar sounds and similar letter to sounds rules as a language from the plurality of languages.

18. The computer-implemented method of claim 1, wherein mixing distributions of acoustic parameters from multiple languages comprises mixing Gaussian probability distributions of acoustic parameters from multiple languages.

19. A computer-implemented method in which a computer system initiates execution of software instructions stored in memory for multilingual speech recognition, the computer-implemented method comprising:
accepting a recognition vocabulary that includes words from multiple languages;
determining a pronunciation of each of the words in the recognition vocabulary using a pronunciation estimator that is common to the multiple languages;
determining an acoustic word model for each of the words in the recognition vocabulary by mapping subword units in the estimated pronunciation to acoustic subword models, at least some of which comprise a mix of distributions of acoustic parameters representing the sounds of the subword unit in multiple languages, and combining the acoustic subword models; and
configuring a speech recognizer using the determined acoustic word models of the words in the recognition vocabulary.

20. The computer-implemented method of claim 19 further comprising:
accepting a training vocabulary that comprises words from multiple languages;
determining a pronunciation of each of the words in the training vocabulary using the pronunciation estimator that is common to the multiple languages;
configuring the speech recognizer using parameters estimated using the determined pronunciations of the words in the training vocabulary; and
recognizing utterances using the configured speech recognizer.

21. A computer program product, tangibly embodied in a storage medium, the computer program product being operable to cause data processing apparatus to:
accept text spellings of training words in a plurality of sets of training words, each set corresponding to a different one of a plurality of languages;
for each of the sets of training words in the plurality, receive pronunciations for the training words in the set, the pronunciations being characteristic of native speakers of the language of the set, the pronunciations also being in terms of subword units at least some of which are common to two or more of the languages;
train a pronunciation estimator using data comprising the text spellings and the pronunciations of the training words; and
calculating a single acoustic subword model for each subword unit, based on the pronunciations in the plurality of sets of training words, by mixing distributions of acoustic parameters representing the sounds of the subword unit in multiple languages when a subword unit is common to two or more languages.

22. The computer program product of claim 21, the computer program product being further operable to cause the data processing apparatus to:
accept a plurality of sets of utterances, each set corresponding to a different one of the plurality of languages, the utterances in each set being spoken by the native speakers of the language of each set; and
train a set of acoustic models for the subword units using the accepted sets of utterances and pronunciations estimated by the single pronunciation estimator from text representations of the training utterances.

23. The computer program product of claim 22, wherein a first training word in a first set in the plurality corresponds to a first language and a second training word in a second set corresponds to a second language, the first and second training words having identical text spellings, the received pronunciations for the first and second training words being different.

24. The computer program product of claim 23, wherein utterances of the first and the second training words are used to train a common subset of subword units.

25. The computer program product of claim 21, wherein the single pronunciation estimator uses a decision tree to map letters of the text spellings to pronunciation subword units.

26. The computer program product of claim 21, wherein training the single pronunciation estimator further comprises:
form, from sequences of letters of each training word's textual spelling and the corresponding grouping of subword units of the pronunciation, a letter to subword mapping for each training word; and train the single pronunciation estimator using the letter-to-subword mappings.

27. The computer program product of claim 22, wherein training the single pronunciation estimator and training the acoustic models is executed by a nonportable programmable device.

28. The computer program product of claim 22, the computer program product being further operable to cause the data processing apparatus to:
generate, for each word in a list of words to be recognized, an acoustic word model, the generating comprising generating a grouping of subword units representing a pronunciation of the word to be recognized using the single pronunciation estimator.

29. The computer program product of claim 28 wherein the grouping of subword units is a linear sequence of subword units.

30. The computer program product of claim 29, wherein the grouping of the acoustic subword models is a linear sequence of acoustic subword models.

31. The computer program product of claim 28, wherein the subword units are phonemes.

32. The computer program product of claim 28, wherein the grouping of subwords is a network, and the network represents two pronunciations of a word, the two pronunciations being representative of utterances of native speakers of two languages.

33. The computer program product of claim 28, the computer program product being further operable to cause the data processing apparatus to:
process an utterance; and
score matches between the processed utterance and the acoustic word models.

34. The computer program product of claim 33, wherein generating the acoustic word model, processing the utterance, and scoring matches is executed by a portable programmable device.

35. The computer program product of claim 34, wherein the portable programmable device is a cellphone.

36. The computer program product of claim 33, wherein the utterance is spoken by a native speaker of one of the plurality of languages.

37. The computer program product of claim 35, wherein the utterance is spoken by a native speaker of a language other than the plurality of languages, the language having similar sounds and similar letter to sounds rules as a language from the plurality of languages.

38. A computer program product, tangibly embodied in a storage medium, for recognizing words spoken by native speakers of multiple languages, the computer program product being operable to cause data processing apparatus to:
generate a set of estimated pronunciations, using a single pronunciation estimator, from text spellings of a set of acoustic training words, each pronunciation comprising a grouping of subword units, the set of acoustic training words comprising at least a first word and a second word, the first and second words having identical text spelling, the first word having a pronunciation based on utterances of native speakers of a first language, the second word having a pronunciation based on utterances of native speakers of a second language;
map sequences of sound associated with utterances of each of the acoustic training words against the estimated pronunciation associated with each of the acoustic training words; and
use the mapping of sequences of sound to estimated pronunciations to generate a single acoustic subword model for each of the subword units in the grouping of subwords, by mixing distributions of acoustic parameters representing the sounds of the subword unit in multiple languages when a subword model comprising a sound model and a subword unit.

39. A computer program product, tangibly embodied in a storage medium, for multilingual speech recognition, the computer program product being operable to cause data processing apparatus to:
accept a recognition vocabulary that includes words from multiple languages;
determine a pronunciation of each of the words in the recognition vocabulary using a pronunciation estimator that is common to the multiple languages;
determining an acoustic word model for each of the words in the recognition vocabulary by mapping subword units in the estimated pronunciation to acoustic subword models, at least some of which comprise a mix of distributions of acoustic parameters representing the sounds of the subword unit in multiple languages, and combining the acoustic subword models; and
configure a speech recognizer using the determined acoustic word models of the words in the recognition vocabulary.

40. The computer program product of claim 39, the computer program product being further operable to cause data processing apparatus to:
accept a training vocabulary that comprises words from multiple languages;
determine a pronunciation of each of the words in the training vocabulary using the pronunciation estimator that is common to the multiple languages;
configure the speech recognizer using parameters estimated using the determined pronunciations of the words in the training vocabulary; and
recognize utterances using the configured speech recognizer.

41. A computer system comprising:
a processor;
a memory coupled to the processor, the memory storing instructions that when executed by the processor cause the system to perform the operations of:
accepting text spellings of training words in a plurality of sets of training words, each set corresponding to a different one of a plurality of languages;
receiving, for each of the sets of training words in the plurality, pronunciations for the training words in the set, the pronunciations being characteristic of native speakers of the language of the set, the pronunciations also being in terms of subword units at least some of which are common to two or more of the languages;
training a single pronunciation estimator using data comprising the text spellings and the pronunciations of the training words; and
calculating a single acoustic subword model for each subword unit, based on pronunciations in the plurality of sets of training words, by fixing distributions of acoustic parameters representing the sounds of the subword unit in multiple languages when a subword unit is common to two or more languages.

42. The computer system of claim 41 the memory storing further instructions that when executed by the processor causes the system to perform the operations of:
accepting a plurality of sets of utterances, each set corresponding to a different one of the plurality of languages, the utterances in each set being spoken by the native speakers of the language of each set; and training a set of acoustic models for the subword units using the accepted sets of utterances and pronunciations estimated by the single pronunciation estimator from text representations of the training utterances.

43. The computer system of claim 42 the memory storing further instructions that when executed by the processor causes the system to perform the operations of:

generating, for each word in a list of words to be recognized, an acoustic word model, the generating comprising generating a grouping of subword units representing a pronunciation of the word to be recognized using the single pronunciation estimator.

44. The computer system of claim 43 the memory storing further instructions that when executed by the processor causes the system to perform the operations of:

processing an utterance; and scoring matches between the processed utterance and the acoustic word models.

45. A computer system for recognizing words spoken by native speakers of multiple languages, the computer system comprising:

a processor;

a memory coupled to the processor, the memory storing instructions that when executed by the processor cause the system to perform the operations of:

generating a set of estimated pronunciations, using a pronunciation estimator, from text spellings of a set of acoustic training words, each pronunciation comprising a grouping of subword units, the set of acoustic training words comprising at least a first word and a second word, the first and second words having identical text spelling, the first word having a pronunciation based on utterances of native speakers of a first language, the second word having a pronunciation based on utterances of native speakers of a second language;

mapping sequences of sound associated with utterances of each of the acoustic training words against the estimated pronunciation associated with each of the acoustic training words; and using the mapping of sequences of sound to estimated pronunciations to generate a single acoustic subword model for each of the subword units in the grouping of subwords, by mixing distributions of acoustic parameters representing the sounds of the subword unit in multiple languages when a subword unit is common to two or more languages, the acoustic subword model comprising a sound model and a subword unit.

46. A computer system for multilingual speech recognition, the computer system comprising:

a processor;

a memory coupled to the processor, the memory storing instructions that when executed by the processor cause the system to perform the operations of:

accepting a recognition vocabulary that includes words from multiple languages;

determining a pronunciation of each of the words in the recognition vocabulary using a pronunciation estimator that is common to the multiple languages;

determining a pronunciation of each of the words in the recognition vocabulary using a pronunciation estimator that is common to the multiple languages;

determining an acoustic word model for each of the words in the recognition vocabulary by mapping subword units in the estimated pronunciation to acoustic subword models, at least some of which comprise a mix of distributions of acoustic parameters representing the sounds of the subword unit in multiple languages, and combining the acoustic subword models; and configuring a speech recognizer using the determined acoustic words models of the words in the recognition vocabulary.

47. A computer-implemented method in which a computer system initiates execution of software instructions stored in memory for recognizing words spoken by native speakers of multiple languages, the computer-implemented method comprising:

generating a set of estimated pronunciations, using a single pronunciation estimator, from text spellings of a set of acoustic training words, each pronunciation comprising a grouping of subword units, the set of acoustic training words comprising at least a first word and a second word, the first and second words having identical text spelling, the first word having a pronunciation based on utterances of native speakers of a first language, the second word having a pronunciation based on utterances of native speakers of a second language;

mapping sequences of sound associated with utterances of each of the acoustic training words against the estimated pronunciation associated with each of the acoustic training words; and using the mapping of sequences of sound to estimated pronunciations to generate a single acoustic subword model for each of the subword units in the grouping of subwords, by mixing distributions of acoustic parameters representing the sounds of the subword unit in multiple languages when a subword unit is common to two or more languages, the acoustic subword model comprising a sound model and a subword unit.

48. A computer-implemented method in which a computer system initiates execution of software instructions stored in memory, the computer-implemented method comprising:

accepting text spellings of training words in a plurality of sets of training words, each set corresponding to a different one of a plurality of languages;

for each of the sets of training words in the plurality, receiving pronunciations for the training words in the set, the pronunciations being characteristic of native speakers of the language of the set, the pronunciations also being in terms of subword units at least some of which are common to two or more of the languages;

training a pronunciation estimator using data comprising the text spellings and the pronunciations of the training words; and calculating an acoustic subword model for each subword unit, based on the pronunciations in the plurality of sets of training words, by mixing distributions of acoustic parameters from multiple languages when a subword unit is common to two or more languages, wherein an acoustic subword model for a subword unit that is common to two or more languages comprises a probability distribution that is a weighted blend of probability distributions each corresponding to a different sound associated with the subword unit.

* * * * *